US011203289B2

(12) United States Patent
Wheeler et al.

(10) Patent No.: US 11,203,289 B2
(45) Date of Patent: Dec. 21, 2021

(54) EMERGENCY CENTER HIGH MOUNTED STOP LAMP (CHMSL) CONTROLLER

(71) Applicant: Enterprise Electronics LLC, Rochester Hills, MI (US)

(72) Inventors: Patsy C. Wheeler, Snow Mass, CO (US); David J. Pearson, Bruce Township, MI (US); Jeff Vogel, Troy, MI (US); Benson Brady, Detroit, MI (US); Jeffrey Allan Makelim, North Canton, MI (US)

(73) Assignee: Enterprise Electronics LLC, Rochester Hills, MI (US)

( * ) Notice: Subject to any disclaimer, the term of this patent is extended or adjusted under 35 U.S.C. 154(b) by 0 days.

(21) Appl. No.: 16/690,577

(22) Filed: Nov. 21, 2019

(65) Prior Publication Data

US 2021/0155154 A1 May 27, 2021

(51) Int. Cl.
*B60Q 1/52* (2006.01)
*B60Q 1/30* (2006.01)
*B60R 16/033* (2006.01)
*B60Q 1/44* (2006.01)

(52) U.S. Cl.
CPC ............... *B60Q 1/52* (2013.01); *B60Q 1/302* (2013.01); *B60Q 1/445* (2013.01); *B60R 16/033* (2013.01); *B60Q 2400/20* (2013.01); *B60Y 2400/114* (2013.01)

(58) Field of Classification Search
CPC .......... B60Q 1/52; B60Q 1/302; B60Q 1/445; B60Q 2400/20; B60R 16/033; B60Y 2400/114
See application file for complete search history.

(56) References Cited

U.S. PATENT DOCUMENTS

| 5,677,670 | A | * | 10/1997 | Gangloff | ................ | B60Q 1/302 |
| | | | | | | 200/61.45 R |
| 6,178,375 | B1 | * | 1/2001 | Breunig | ................ | B60R 21/013 |
| | | | | | | 280/5.507 |
| 6,265,851 | B1 | * | 7/2001 | Brien | ..................... | B60L 50/52 |
| | | | | | | 320/162 |
| 6,744,359 | B1 | * | 6/2004 | Wasilewski | .............. | B60Q 1/44 |
| | | | | | | 307/10.8 |
| 7,090,371 | B1 | * | 8/2006 | Bonar | .................. | B60Q 1/0491 |
| | | | | | | 307/10.8 |

(Continued)

*Primary Examiner* — Nay Tun
(74) *Attorney, Agent, or Firm* — The Law Offices of John G. Posa

(57) ABSTRACT

An improved Center High Mounted Stop Lamp (CHMSL) harvests electrical power while providing additional features when the CHMSL is not powered during a brake application. Electronic circuitry determines if the different sources of electrical power have sufficient energy to activate the light-emitting device; senses a vehicle braking or emergency event to activate the light-emitting device upon sensing the event; and switches from one source of electrical power to a different source of electrical power if it is determined that a particular source of electrical power has become depleted or incapable of activating the light-emitting device. The different sources of electrical power may include a super-capacitor, a rechargeable battery, or a primary battery. The electronic circuitry operative to sense a braking or emergency event may include a brake signal input or an inertial measurement unit (IMU).

29 Claims, 1 Drawing Sheet

(56) References Cited

U.S. PATENT DOCUMENTS

| | | | |
|---|---|---|---|
| 7,466,082 B1 * | 12/2008 | Snyder | H05B 45/37 315/200 A |
| 7,581,848 B1 * | 9/2009 | Parsons | F21L 4/027 200/60 |
| 7,687,999 B2 * | 3/2010 | Essick | B60Q 1/44 315/200 A |
| 8,405,498 B1 * | 3/2013 | Smith | B60R 21/01 340/463 |
| 8,712,599 B1 * | 4/2014 | Westpfahl | B60R 21/0132 701/1 |
| 9,521,732 B1 * | 12/2016 | Spofford | A45C 13/24 |
| 10,124,757 B1 * | 11/2018 | Kerr | B60Q 1/302 |
| 10,322,824 B1 * | 6/2019 | Demont | B64D 45/00 |
| 2005/0152142 A1 * | 7/2005 | Traynor | E01F 9/559 362/249.01 |
| 2006/0238026 A1 * | 10/2006 | Lich | B60R 21/0133 303/191 |
| 2006/0255966 A1 * | 11/2006 | McKenna | G08G 1/0965 340/902 |
| 2006/0267750 A1 * | 11/2006 | Lu | B60C 23/062 340/440 |
| 2006/0273891 A1 * | 12/2006 | Quach | B60Q 1/302 340/467 |
| 2007/0046499 A1 * | 3/2007 | McKenna | G08G 1/0965 340/902 |
| 2007/0142986 A1 * | 6/2007 | Alaous | G07C 5/0858 701/33.4 |
| 2007/0159113 A1 * | 7/2007 | Essick | B60Q 1/50 315/200 A |
| 2008/0046147 A1 * | 2/2008 | Cluff | B60R 21/01332 701/45 |
| 2008/0079555 A1 * | 4/2008 | Wang | B60Q 1/448 340/479 |
| 2008/0243335 A1 * | 10/2008 | Rao | B60C 23/0408 701/38 |
| 2008/0260387 A1 * | 10/2008 | Seo | G08C 23/04 398/106 |
| 2011/0062777 A1 * | 3/2011 | Sotnikow | H02J 7/1423 307/9.1 |
| 2012/0249343 A1 * | 10/2012 | Thomas | G08G 1/096783 340/905 |
| 2017/0051697 A1 * | 2/2017 | Campbell | B60R 21/013 |
| 2017/0107747 A1 * | 4/2017 | Dente | E05B 81/04 |
| 2017/0282787 A1 * | 10/2017 | Salter | B60Q 1/0011 |
| 2018/0034313 A1 * | 2/2018 | Frankland | H02J 9/005 |
| 2019/0031125 A1 * | 1/2019 | Rozman | B60L 50/51 |
| 2019/0071044 A1 * | 3/2019 | Nezaki | B60R 21/017 |
| 2019/0092257 A1 * | 3/2019 | Boecker | H02J 7/34 |
| 2019/0366915 A1 * | 12/2019 | Kiefaber | B60Q 1/2696 |
| 2020/0130574 A1 * | 4/2020 | Dubois | H05B 45/46 |

\* cited by examiner

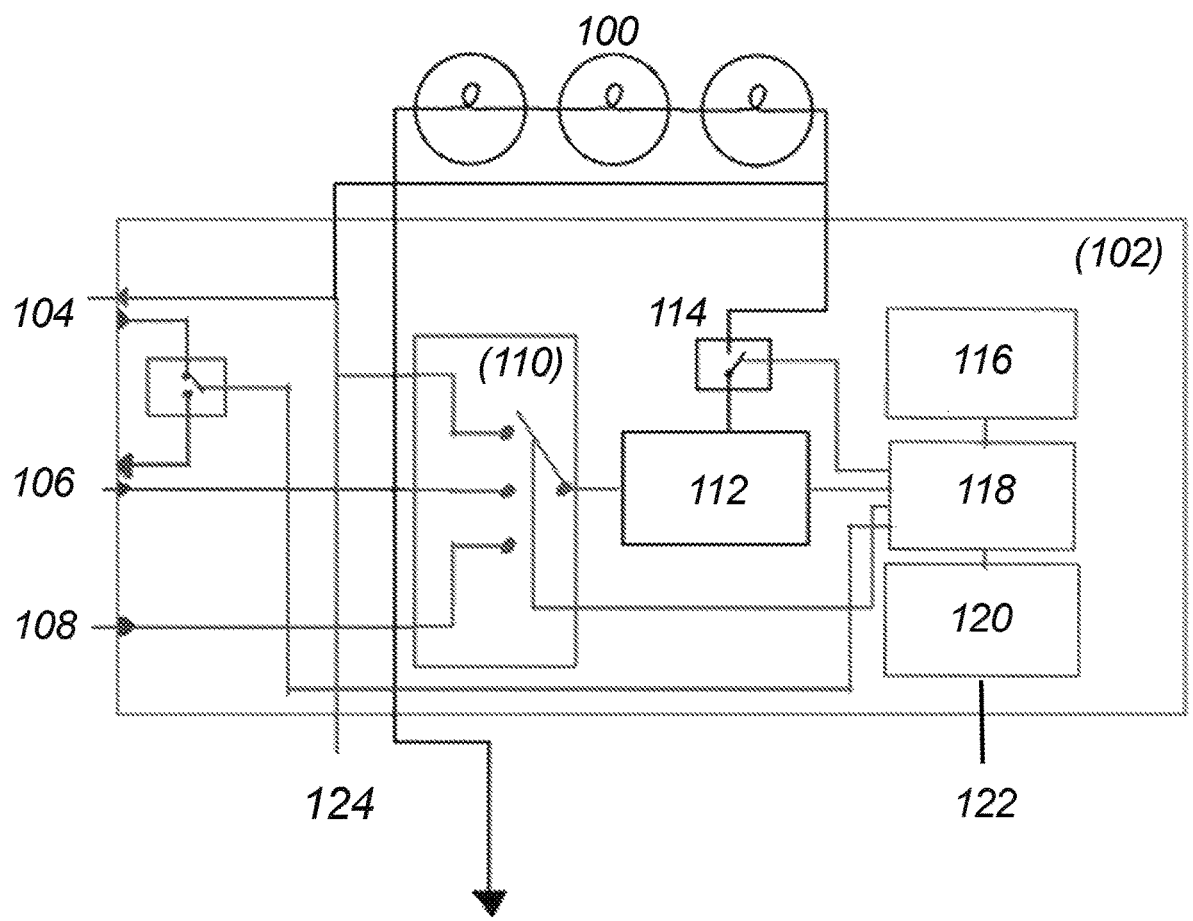

EMERGENCY CENTER HIGH MOUNTED STOP LAMP (CHMSL) CONTROLLER

FIELD OF THE INVENTION

This invention relates generally to externally visible vehicular lighting and, in particular, to a Center High Mounted Stop Lamp (CHMSL) that meets FMVSS requirements while integrating a other capabilities.

BACKGROUND OF THE INVENTION

In the United States and Canada since 1986, in Australia and New Zealand since 1990, and in Europe and other countries applying UN Regulation 48 since 1998, a central stop (brake) lamp mounted higher than the vehicle's left and right stop lamps has been required. This light, referred to as a Center High Mounted Stop Lamp or "CHMSL" is sometimes informally called a "center brake lamp," a "third brake light," an "eye-level brake lamp," a "safety brake lamp," or a "high-level brake lamp." A CHMSL may use one or more filament bulbs or LEDs, or a strip of neon tube as its light source.

The CHMSL is intended to provide a warning to drivers whose view of the vehicle's left and right stop lamps is blocked by interceding vehicles. It also provides a redundant stop light signal in the event of a stop lamp malfunction. In North America, where rear turn signals are permitted to emit red light, the CHMSL also helps to disambiguate brake lights from rear position lights and turn signal lights.

The CHIMSL is typically required to illuminate steadily as opposed to flashing, however U.S. regulators have granted exemptions to evaluate the effectiveness of a flashing CHMSL. Although CHMSL assemblies are standard on all motor vehicles in the United States and most other countries, such assemblies are only powered during a braking application. However, there is an outstanding need for additional capabilities to be integrated in a CHMSL assembly.

SUMMARY OF THE INVENTION

This invention improves upon existing CHMSL technology by delivering enhanced emergency functions for less cost and more utility than similar functions provided in vehicles today. Preferred embodiments offer unique ways to harvest and use electrical power, while providing additional features when the CHMSL is not powered during a brake application.

The preferred embodiments include a lighting system for braking and/or emergency situations configured for center high mounting on the rear of a vehicle. The system includes a housing and at least one light-emitting device such as a high-intensity light-emitting diode (LED). The system includes a plurality of inputs, each input being associated with a different source of electrical power, and electronic circuitry operative to perform the following functions:
 (a) determine if the different sources of electrical power have sufficient energy to activate the light-emitting device;
 (b) sense a vehicle braking or emergency event and activate the light-emitting device upon sensing the event; and
 (b) switch from one source of electrical power to a different source of electrical power if it is determined that a particular source of electrical power has become depleted or incapable of activating the light-emitting device.

The different sources of electrical power may include a supercapacitor, a rechargeable battery, or a primary battery used to start or power the vehicle in hybrid or all-electric vehicles. The at least one light-emitting device may be disposed on or in the housing, or may be disposed remotely from the housing.

The electronic circuitry operative to sense a braking or emergency event may include an inertial measurement unit (IMU). The IMU may be operative to sense a collision along a forward-reverse axis of the vehicle; a spinout along a driver-passenger axis of the vehicle; and/or a rollover vehicle accident along any axis using rotational sensing.

The electronic circuitry operative to sense an emergency or braking event may include an input from a vehicle braking system. A boost converter may be provided to increase the operating voltage of a power source if the voltage of the source falls below a predetermined voltage required to operate the at least one light-emitting source. The electronic circuitry may be further operative to alter the frequency or duty cycle of the at least one light-emitting device to extend the usefulness of a selected source of electrical power, and/or alter the color of the at least one light-emitting device to indicate different emergency events or levels of severity.

BRIEF DESCRIPTION OF THE DRAWINGS

FIG. 1 is block diagram of a preferred embodiment of the invention showing various functional modules.

DETAILED DESCRIPTION OF THE PREFERRED EMBODIMENTS

FIG. 1 is block diagram of a preferred embodiment of the invention showing various functional modules. The various components are disposed in a housing 102 which may be situated internal to a vehicle or mounted on a portion of the exterior. If disposed within the vehicle, CHMSL lights 100 would be in a separate, high-mounted outside enclosure. If housing 102 is outside-mounted, CHMSL lights would be integrated into the enclosure 102. Although any type of CHMSL lights 100 may be used, high-brightness light-emitting diodes are preferred, and all enclosures used are preferably sealed off from the ambient environment.

Overall control is provided by a central-processing unit (CPU) 118 such as an ATMEL (ATMEGA family) or PIC16F family of conventional CPUs, or a proprietary designed ASIC with integrated CPU. The device 118 is preferably a single-chip microcomputer including on-board memory including programmed instructions to carry out at least the functions disclosed herein. One of skill in the art will understand how software would be written to provide these programmed instructions. The CPU 118, as well as the other circuits to be described, may be selected to operate in the automotive temperature range; namely, −40° C. to 125° C.

Electronics in the unit may be powered via one to four power sources with a switching function provide by source charge manager 110 to control input. The first power source 104 is accomplished using a supercapacitor (SC) to rapidly charge during a traditional brake application. Energy from the SC can be used to recharge the second power input, battery 106, or to power the CHMSL during an 'unpowered' event. The battery is preferably a Lithium Polymer battery (LiPo), though other types of batteries may alternatively be used due to the need to operate in the automotive temperature range. While the SC and rechargeable battery are shown external to housing 102, in the preferred embodiment these components are disposed within housing 102.

The third power source is a permanent battery 108 that can be used should the SC and the LiPo become completely depleted. For example, the vehicle's 12-volt battery may be used, or other auxiliary source may be used, particularly if the vehicle is an electric or hybrid vehicle.

Source charge manager 110 is preferably implemented with solid-state switches such as power field-effect transistors or, alternatively, relays or mechanical switches may be used. Power routing in controlled by CPU 118, first choosing SC source 104. That source is sensed as depleted, (i.e., by measuring voltage levels and current capacity against the source profile by the CPU 118), the CPU instead chooses LiPo source 106 and, if that source is or becomes depleted, the permanent battery source 108 is selected. A 'Boost Converter' 112 is used to extend functionality should the operating voltage of the SC, LiPo, Inertia Measurement Unit (IMU) 116 is used to sense emergency events such as a collision along the forward reverse axis, a spinout along the driver-passenger axis, or a rollover along any axis using the rotational sensing of the IMU as available in the BM160 by Bosch or the ICM-20608 from STMicroelectronics. This device also can determine if the vehicle is operating in a driving situation normally to cancel the emergency event.

The GPIO/UART 120 is used to interface via connection 122 to other vehicle electronics over commonly used automotive busses (i.e., CAN/LIN), for receiving constant or switched power from the vehicle battery, or for sensing control functions such as 'hazard lights, turn signals, or reverse.' In the event the GPIO is wired to the vehicle battery, the SC, LiPo, and permanent batteries may be used as 'back up' power sources to the vehicle's main power supply which may become inoperable during a collision. Outputs from the GPIO/UART can be configured to also drive other external loads (i.e., exterior lighting illuminates during loss of vehicle battery) that could be important to drive during an emergency event.

The system may include some or all of the functional modules listed below. The word "may" is used here since different embodiments of the invention may not include all of the modules described. Indeed, the system is intended to be modular enabling the various capabilities to mixed-and-matched for different applications or types of vehicles. These modules may include the following, without limitation:

IMU (Inertia Measurement Unit);
Permanent Battery;
Rechargeable Battery;
Supercapacitor;
GPIO (General Purpose Input/Output Interface); and
Vehicle Interface.

The functions afforded by each of the subsystems are described in detail below.

Generally speaking, the CHMSL system described herein includes some of the features found with factory-installed CHMSLs, while providing several additional capabilities. For example, the system senses when the vehicle is in a collision via either UART 120 and/or via IMU 116 to determine that a collision event has occurred. This may be accomplished either by sensing excessive force, or by sensing an accident indicator such as 'airbags deployed' from the vehicle system.

The system may also generate a warning pattern on the CHMSL an emergency event is sensed from the IMU. This visual warning indicator can be of any pattern, duty cycle, or duration. For example, brake input line 124 may be used to sense a conventional braking function, and/or this input may be used as a trigger from the driver in an medical emergency, or if they are being car-jacked.

The Vehicle Interface 122 is designed to contain common electrical signals used in most vehicles on the road today. These may include, without limitation, battery power, ground, LIN/CAN communication, and outputs for triggering vehicle loads such as lighting and accessory relays or door, window, trunk, liftgate latch relays, etc. Alternatively, the Vehicle Interface 122 may be simplified to include only battery power upon brake activation, which employs the energy harvesting function of the invention.

Energy harvesting is accomplished when external power is applied during a normal braking event from power applied to the system via 124. SCs (104) are charged at a high rate and discharged to charge the LiPo ((106) in the event the LiPo is not fully charged. In the event the LiPo is fully charged, energy from the SC is used to power an emergency event as well as to power the CPU and IMU to monitor for an emergency event. The CPU will enter a low-power mode to eliminate any current draw while there is no movement on the vehicle.

If an emergency event is triggered, the system will perform a visual emergency indicator either until all three power sources are depleted or a predetermined timer expires, or the vehicle is moved at an inertia substantially below the triggering inertia, or a normal braking signal is applied for a predetermined number of applications.

Further, warning functions can be implemented during normal braking events such as (1) a moderately oscillating (i.e 2-5 Hz) flashing light during the braking event if the vehicle is slowing down but has not yet stopped, or (2) a more rapidly (i.e., 5-10 Hz) oscillating flashing light during a more aggressive braking event. Flashing of the light would cease and return to constant-on when the vehicle returned to a stopped or very slow speed as calibrated.

To conserve power during an emergency event, as the available energy sources begin to deplete, CPU 118 can alter the frequency and duty cycle of the load switching to extend the usefulness of the available power source while maintaining desired illumination levels. Visual Emergency indicators may also change color using commonly used RGB LEDs to represent different emergency events of different severity. For example, from yellow to red to indicate increased severity.

The invention claimed is:

1. A vehicular lighting system, comprising:
 a housing configured for center high mounting on the rear of a vehicle;
 at least one light-emitting device disposed on or in the housing;
 a plurality of electrically controlled switches disposed in the housing to route different sources of electrical power to the light-emitting device;
 wherein the different sources of electrical power at least include a supercapacitor and a rechargeable battery; and
 electronic circuitry disposed in the housing to perform the following functions:
  (a) sense a vehicle braking or emergency event, and activate the light-emitting device upon sensing the event, initially selecting the supercapacitor as the source of electrical power to activate the light-emitting device; and (b) cause the one or more electrically controlled switches to switch from the supercapacitor to the rechargeable battery if the supercapacitor has become depleted or incapable of activating the light-emitting device.

2. The lighting system of claim 1, wherein the supercapacitor is charged by vehicle brake application.

3. The lighting system of claim 1, wherein the rechargeable battery is recharged by the supercapacitor.

4. The lighting system of claim 1, wherein the rechargeable battery is used to start or power the vehicle.

5. The lighting system of claim 1, wherein the electronic circuitry operative to sense a braking or emergency event includes an inertial measurement unit (IMU).

6. The lighting system of claim 5, wherein the IMU is operative to sense a collision along a forward-reverse axis of the vehicle.

7. The lighting system of claim 5, wherein the IMU is operative to sense a spinout along a driver-passenger axis of the vehicle.

8. The lighting system of claim 5, wherein the IMU is operative to sense a rollover vehicle accident along any axis using rotational sensing.

9. The lighting system of claim 1, wherein the electronic circuitry operative to sense an emergency or braking event includes an input from a vehicle braking system.

10. The lighting system of claim 1, further including a boost converter operative to increase the operating voltage of a power source if the voltage of the source falls below a predetermined voltage required to operate the light-emitting device.

11. The lighting system of claim 1, wherein the electronic circuitry is further operative to alter a frequency or duty cycle of the at least one light-emitting device.

12. The lighting system of claim 1, wherein the at least one light-emitting device is a multi-color light-emitting diode (LED), and wherein the electronic circuitry is operative to alter the color of the LED to indicate different emergency events or levels of severity.

13. A vehicular lighting system for a vehicle including a primary battery used to start or power the vehicle, the lighting system, comprising:
a housing configured for center high mounting on the rear of a vehicle;
at least one light-emitting device disposed on or in the housing;
a plurality of inputs, each input being associated with a different source of electrical power;
electronic circuitry disposed in the housing operative to perform the following functions:
(a) sense a vehicle braking or emergency event and activate the light-emitting device upon sensing the event, selecting a source of electrical power other than the primary battery used to start or power the vehicle to activate the light-emitting device; and
(b) switch from one source of electrical power to a different source of electrical power if it is determined that a particular source of electrical power has become depleted or incapable of activating the light-emitting device;
wherein the electronic circuitry operative to sense a braking or emergency event includes an inertial measurement unit (IMU), and wherein the IMU is operative to sense the following types of accidents:
a collision along a forward-reverse axis of the vehicle, a spinout along a driver-passenger axis of the vehicle, and a rollover vehicle accident along any axis using rotational sensing.

14. The lighting system of claim 13, wherein one of the different sources of electrical power is a supercapacitor.

15. The lighting system of claim 13, wherein one of the different sources of electrical power is a rechargeable battery.

16. The lighting system of claim 13, wherein one of the different sources of electrical power is a permanent battery used to start or power the vehicle.

17. The lighting system of claim 13, wherein the electronic circuitry is further operative to alter a frequency or duty cycle of the at least one light-emitting device.

18. The lighting system of claim 13, wherein the light-emitting device is a multi-color LED (light-emitting diode), and the electronic circuitry is operative to alter the color of the LED during an emergency situation.

19. A vehicular lighting system for a vehicle including a primary battery used to start or power the vehicle, the lighting system comprising:
a housing configured for center high mounting on the rear of the vehicle;
at least one light-emitting device disposed on or in the housing;
a plurality of electrically controlled switches disposed in the housing to route different sources of electrical power to the light-emitting device;
wherein the different sources of electrical power at least include a source within the housing and the primary battery used to start or power the vehicle;
electronic circuitry disposed in the housing to perform the following functions:
(a) sense a vehicle braking or emergency event, and activate the light-emitting device initially selecting the source of electrical power within the housing to activate the light-emitting device; and
(b) cause the one or more electrically controlled switches to switch to the primary battery to start or power the vehicle if the source of electrical power within the housing has become depleted or incapable of activating the light-emitting device.

20. The lighting system of claim 19, wherein the source of electrical power within the housing is a rechargeable battery.

21. The lighting system of claim 19, wherein the source of electrical power within the housing is a supercapacitor.

22. The lighting system of claim 21, wherein the supercapacitor is charged by vehicle brake application.

23. The lighting system of claim 22, including two sources of electrical power disposed within the housing comprising a supercapacitor and a rechargeable battery.

24. The lighting system of claim 23, wherein the rechargeable battery disposed within the housing is recharged by the supercapacitor.

25. The lighting system of claim 19, wherein the vehicle is an electric or hybrid vehicle.

26. The lighting system of claim 19, wherein the electronic circuitry operative to sense a braking or emergency event includes an inertial measurement unit (IMU).

27. The lighting system of claim 19, wherein the electronic circuitry operative to sense an emergency or braking event includes an input from a vehicle braking system.

28. The lighting system of claim 19, wherein the electronic circuitry is further operative to alter a frequency or duty cycle of the at least one light-emitting device.

29. The lighting system of claim 19, wherein the at least one light-emitting device is a multi-color light-emitting diode (LED), and wherein the electronic circuitry is operative to alter the color of the LED to indicate different emergency events or levels of severity.

\* \* \* \* \*